US010635439B2

(12) United States Patent
Alsup et al.

(10) Patent No.: US 10,635,439 B2
(45) Date of Patent: Apr. 28, 2020

(54) EFFICIENT INTERFACE AND TRANSPORT MECHANISM FOR BINDING BINDLESS SHADER PROGRAMS TO RUN-TIME SPECIFIED GRAPHICS PIPELINE CONFIGURATIONS AND OBJECTS

(71) Applicant: Samsung Electronics Co., Ltd., Suwon-si, Gyeonggi-do (KR)

(72) Inventors: Mitchell K. Alsup, Austin, TX (US); David C. Tannenbaum, Austin, TX (US); Derek Lentz, Reno, NV (US); Srinivasan S. Iyer, Austin, TX (US); Christopher J. Goodman, Round Rock, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 16/127,104

(22) Filed: Sep. 10, 2018

(65) Prior Publication Data
US 2019/0384600 A1 Dec. 19, 2019

Related U.S. Application Data

(60) Provisional application No. 62/684,680, filed on Jun. 13, 2018.

(51) Int. Cl.
| | | |
|---|---|---|
| *G06T 1/20* | (2006.01) | |
| *G06F 9/30* | (2018.01) | |
| *G06T 15/80* | (2011.01) | |
| *G06F 9/38* | (2018.01) | |
| *G06T 1/60* | (2006.01) | |
| *G06T 15/00* | (2011.01) | |

(52) U.S. Cl.
CPC ........ *G06F 9/30025* (2013.01); *G06F 9/3017* (2013.01); *G06F 9/3867* (2013.01); *G06T 1/20* (2013.01); *G06T 1/60* (2013.01); *G06T 15/005* (2013.01); *G06T 15/80* (2013.01)

(58) Field of Classification Search
CPC .. G06F 9/30025; G06F 9/3017; G06F 9/3867; G06T 1/20; G06T 1/60; G06T 15/005; G06T 15/80
USPC .................................................. 345/501, 506
See application file for complete search history.

(56) References Cited

U.S. PATENT DOCUMENTS

| | | | |
|---|---|---|---|
| 7,489,315 B1 | 2/2009 | Nordquist | |
| 7,839,410 B1 * | 11/2010 | Brown | .................... G06T 15/04 345/541 |
| 7,932,914 B1 | 4/2011 | Geiss et al. | |
| 7,958,498 B1 * | 6/2011 | Brown | .................... G06F 8/443 717/139 |

(Continued)

*Primary Examiner* — Jacinta M Crawford
(74) *Attorney, Agent, or Firm* — Lewis Roca Rothgerber Christie LLP

(57) ABSTRACT

A system and method for binding instructions to a graphical processing unit (GPU) includes a GPU configured to receive bindlessly compiled instructions and interpret the bindlessly compiled instruction at runtime to identify a needed conversion The GPU generates a conversion information based on the bindlessly compiled instruction and needed conversion and converts the bindlessly compiled instruction according to the conversion information to generate a bound format instruction. The GPU may then execute the bound format instruction.

26 Claims, 6 Drawing Sheets

(56) References Cited

U.S. PATENT DOCUMENTS

| | | | |
|---|---|---|---|
| 8,044,951 B1* | 10/2011 | Brown | G06T 15/005 345/419 |
| 8,106,914 B2 | 1/2012 | Oberman et al. | |
| 8,468,507 B2 | 6/2013 | Agarwal et al. | |
| 2009/0251475 A1* | 10/2009 | Mathur | G06T 1/20 345/533 |
| 2014/0098117 A1* | 4/2014 | Goel | G06T 1/20 345/522 |
| 2014/0354658 A1* | 12/2014 | Dotsenko | G06T 1/20 345/522 |
| 2014/0354669 A1* | 12/2014 | Galazin | G06T 11/001 345/582 |
| 2014/0362093 A1* | 12/2014 | Lorach | G06T 15/005 345/522 |
| 2015/0221059 A1* | 8/2015 | Baker | G06T 1/20 345/522 |
| 2016/0104457 A1 | 4/2016 | Wu et al. | |
| 2016/0111059 A1 | 4/2016 | Bolz | |
| 2016/0163015 A1 | 6/2016 | Riguer et al. | |
| 2017/0069055 A1* | 3/2017 | Yoo | G06T 15/005 |
| 2017/0358129 A1 | 12/2017 | Chen et al. | |

* cited by examiner

Instruction 400: ① FMUL $o_6$, $R_3$, $R_2$
Instruction 410: ② FADD $o_7$, $R_4$, $R_5$
Instruction 420: ③ FMUL Fv, $R_4$, $R_3$

FIG. 4A

Instruction 430: ① FMUL Fv, $R_3$, $R_2$
Instruction 440: ② FCU $R_{EMIT}$, Fv; FADD Fv, $R_4$, $R_5$
Instruction 450: ③ FCU $R_{EMIT}$, Fv; FMUL Fv, $R_4$, $R_3$

FIG. 4B

EFFICIENT INTERFACE AND TRANSPORT MECHANISM FOR BINDING BINDLESS SHADER PROGRAMS TO RUN-TIME SPECIFIED GRAPHICS PIPELINE CONFIGURATIONS AND OBJECTS

CROSS-REFERENCE TO RELATED APPLICATION(S)

The present application claims priority to and the benefit of U.S. Provisional Patent Application Ser. No. 62/684,680, filed Jun. 13, 2018 and entitled "EFFICIENT INTERFACE AND TRANSPORT MECHANISM FOR BINDING BINDLESS SHADER PROGRAMS TO RUN-TIME SPECIFIED GRAPHICS PIPELINE CONFIGURATIONS AND OBJECTS," the entire content of which is hereby expressly incorporated by reference.

FIELD

One or more aspects of embodiments according to the present disclosure relates to graphical processing units.

BACKGROUND

GPUs perform a variety of operations consisting of programmable and fixed-function stages. In modern GPUs the programmable operations are performed in shared, flexible programmable engines (PEs) capable of running a variety of shaders (e.g., programs) for different operations. The shaders are programmed by an outside application utilizing the GPU. For example, some shaders work on primitives/vertices (triangles, lines, points, etc.) and others for working on pixels (or sub-pixel samples, etc.) and still others for working on compute applications (such as physics problems as part of a real-time game engine.)

Shader (programs) are compiled from a high-level programming language (e.g., similar to C) into an Instruction Set Architecture (ISA) targeted to operate on PEs. The ability to use a high-level programming language is facilitated through the use of a variety of application program interfaces (APIs). Thus, the application programmer is able to utilize a high-level programming abstraction in which to describe the desired functionality. However, the compilation is performed without full knowledge of the pipeline configuration in which the compiled code will later be run. Since the compilation is run prior to binding the compiled code to a particular configuration, it is termed bindless.

Bindless code is not optimized for a GPU's pipeline configuration. In many cases, a mechanism is needed to perform format conversions and layout rearrangements necessary for the program and hardware configuration to work together (e.g., the code needs to be bound). For example, in some cases, some systems may perform incremental recompiles or link stages to properly bind the object code for use in a GPU's specific pipeline. In many cases, past technologies for performing this binding have been slow and/or hardware intensive. Thus, a new method of binding code based on the pipeline configuration is needed to improve overall rendering performance.

The above information is only for enhancement of understanding of the background of embodiments of the present disclosure, and therefore may contain information that does not form the prior art.

SUMMARY

Some embodiments of the present disclosure provide a system and method for binding instructions to a graphical processing unit (GPU). In various embodiments, the system may receive a bindlessly compiled instruction at the GPU. The bindlessly compiled instruction may be interpreted at runtime to identify a needed conversion. A conversion information based on the bindlessly compiled instruction and needed conversion may be generated. The bindlessly compiled instruction be converted according to the conversion information to generate a bound format instruction and the bound format instruction is executed.

In various embodiments, the system interprets the bindlessly compiled instruction at runtime to identify a needed conversion by recognizing, by a WARP sequencer when the bindlessly compiled instruction should be converted to correspond to an API-specified GPU hardware configuration.

In various embodiments, the WARP sequencer includes an instruction pipeline having a top of instruction pipeline configured to interpret the bindlessly compiled instruction and generate the conversion information.

In various embodiments, converting the bindlessly compiled instruction according to the conversion information to generate a bound format instruction includes: receiving, at a processing engine, the bindlessly compiled instruction and the conversion information; and generating, using a format conversion unit of the processing engine, the bound format instruction using the bindlessly compiled instruction and the conversion information.

In various embodiments, the format conversion unit operates in parallel with at least one of an integer or a floating point unit of the processing engine.

In various embodiments, the conversion information includes at least one of a render target format, a render target layout, or a texture format.

In various embodiments, the system further provides the bindlessly compiled instruction and the conversion information to a load store unit (LSU) and maps a shader output layout to a buffer layout.

In various embodiments, mapping the shader output layout to a buffer layout includes at least one of providing a default value for a missing component or discarding an extra component.

In various embodiments, a GPU includes a fixed-function unit; a WARP sequencer configured to receive a bindlessly compiled instruction and generate a conversion information based on the bindlessly compiled instruction and the fixed-function unit; and a processing engine configured to receive the bindlessly compiled instruction and generate a bound format instruction based on the bindlessly compiled instruction and the conversion information.

In various embodiments, the processing engine includes a format conversion unit, where the format conversion unit is configured to receive the bindlessly compiled instruction and the conversion information and generate a bound format instruction using the bindlessly compiled instruction and the conversion information.

In various embodiments, the fixed-function unit includes a render buffer.

In various embodiments, the fixed-function unit is a rasterization subsystem.

In various embodiments, the fixed-function unit has a load store unit.

In various embodiments, the conversion information has a render target layout.

In various embodiments, the load store unit is configured to generate a table for receiving updates from a shader operating on the GPU and provide an output to a render target according to the render target layout when the shader program has completed.

In various embodiments, the load store unit is further configured to provide a default value to the render target for a missing value that was not provided by the shader.

In various embodiments, the load store unit is further configured to discard a value provided by the shader that is not required by the render target format.

In various embodiments, the conversion information comprises a render target format.

In various embodiments, the conversion information comprises a texture format.

In various embodiments, the WARP sequencer comprises a table of render target formats.

In various embodiments, the WARP sequencer comprises an instruction pipeline having a top of instruction pipeline configured to interpret the bindlessly compiled instruction and generate the conversion information.

In various embodiments, a method for binding instructions to a graphical processing unit (GPU) includes: receiving a bindlessly compiled instruction at the GPU; interpreting, by a WARP sequencer of the GPU, the bindlessly compiled instruction at runtime to identify a needed conversion; generating, by the WARP sequencer, a conversion information based on the bindlessly compiled instruction and needed conversion; providing, by the WARP sequencer, the bindlessly compiled instruction and the conversion information to a processing engine; converting, by a format conversion unit of the processing engine, the bindlessly compiled instruction according to the conversion information to generate a bound format instruction; and executing, by the processing engine, the bound format instruction.

In various embodiments, the WARP sequencer includes an instruction pipeline having a top of instruction pipeline configured to interpret the bindlessly compiled instruction and generate the conversion information.

In various embodiments, the conversion information has at least one of a render target format, a render target layout, or a texture format.

In various embodiments, the method further includes: providing, by the WARP sequencer, the bindlessly compiled instruction and the conversion information to a load store unit (LSU); and mapping, by the LSU, a shader output layout to a buffer layout.

In various embodiments, mapping the shader output layout to a buffer layout includes at least one of providing a default value for a missing component or discarding an extra component.

BRIEF DESCRIPTION OF THE DRAWINGS

Some embodiments can be understood in more detail from the following description taken in conjunction with the accompanying drawings, in which:

FIG. 4A depicts an example assembly code sequence provided by a shader according to various embodiments;

FIG. 4B depicts an example assembly code sequence that has been converted according to various embodiments;

DETAILED DESCRIPTION

Figure 1:
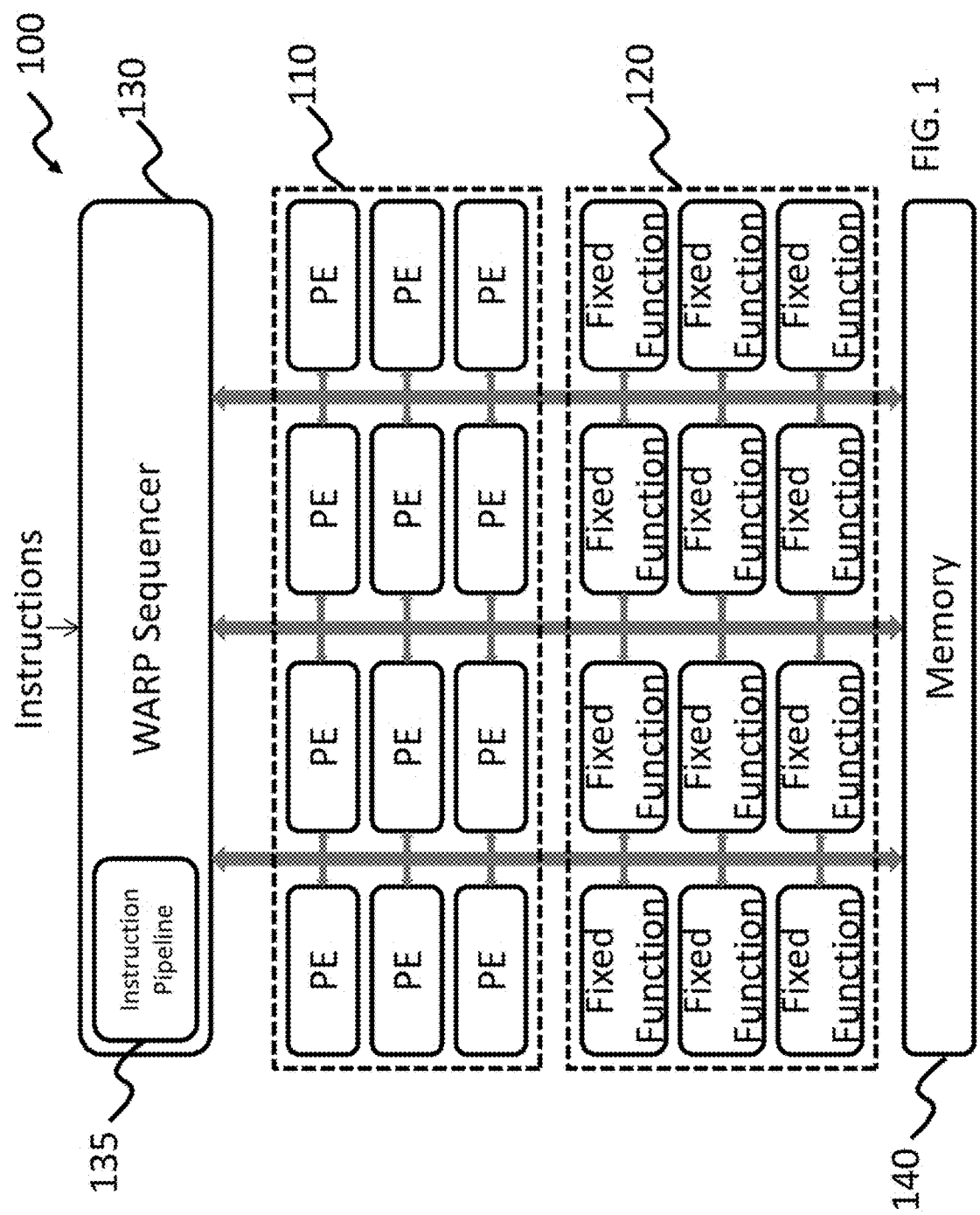
FIG. 1 depicts a functional block diagram of an example GPU architecture according to various embodiments.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Embodiments of the present disclosure include a system and method for binding bindless code to a hardware configuration. For example, a GPU may include various configuration or format differences that are not accounted for by a compiler that bindlessly compiles code. For example, a GPU may have a render pipeline with a plurality of programmable stages (shaders), fixed functions, and intermediate buffers. In various embodiments, the fixed functions and intermediate buffers may have specific requirements for input that is provided (e.g., target configurations and/or texture formats). In various embodiments, compilation of an application (e.g., an application to operate as a shader on a programmable stage) is performed by a compiler lacking knowledge of the configuration of the render target(s) or texture(s) to which the object code will later be bound. In various embodiments, the system is configured to allow arbitrary shader programs compiled bindlessly to interface with arbitrarily configured render target buffers having data (pixel) formats that are bound at runtime and may be used with different render target formats at different times. In some cases, shaders may be pre-compiled into libraries that can be applied without knowledge of the runtime formats at compile time. The conversion (binding) may include dynamically modifying instructions execution in a fashion that is transparent to the compiled object code. For example, in various embodiments a compiler produces generic instructions that are interpreted at runtime and any needed conversions are identified and implemented. For example, in some embodiments, predefined subroutines can be called based on the needed conversion. Thus, in various embodiments, binding is performed fully in hardware so, although there is system complexity, there is no compiler complexity and thus the runtime compilation problem is not compounded with the burden of a Formats are received from application through API calls and software driver implementation of these calls.

Although discussed with reference to a GPU architecture, this disclosure is not limited thereto. For example, various embodiments may apply to any system that involves an API and binderless coding. For example, in various embodiments, the system may be utilized in video cameras or audio capture devices, if they may be changed (mode of operation or device changed) and are utilized through an API.

FIG. 1 depicts a functional block diagram of an example GPU architecture according to various embodiments.

Referring to FIG. 1, in various embodiments, a GPU 100 includes a variety of programmable stages and fixed-function stages. For example, in various embodiments, the GPU 100 includes programmable processing engines (PEs) 110 capable of executing various computational functions. For example, each of the PEs 110 may be capable of operating various shaders according to instructions provided by a program. The shaders may include vertex shaders, tessellation shaders, geometry shaders, fragment shaders (e.g., pixel shaders), etc. In various embodiments, groups or clusters of PEs may be used to implement a series of instructions in parallel. In various embodiments, each of the PEs or each group of PEs 110 includes a format conversion unit (FCU) that is configured to work in parallel with either integer or floating point units operating on each of the PEs 110.

The GPU 100 also includes a plurality of fixed-function stages 120. The fixed-function stages 120 may, for example include load/store units (LSUs), data path units, special function units (SFUs), buffers, rasterization subsystems etc. In various embodiments, one LSU may be shared by a fixed number of PEs 110. The GPU also includes a WARP sequencer 130 configured to receive instructions, allocate resources (e.g., the PEs 110 and fixed-function stages 120), and schedule work performed. For example, in various embodiments, the WARP sequencer 130 is configured to schedule the transfer of data to and from the PEs 110 using a LSU. In various embodiments, the WARP sequencer 130 informs the LSUs and the PEs 110 of any special format conversion that is needed for an instruction to work with the fixed-function stages 120 in the GPU pipeline.

In various embodiments, the WARP sequencer 130 includes an instruction pipeline 135 and the top of the instruction pipeline may include instruction parser logic that is configured to parse the instructions and determine the resources the instruction needs. In various embodiments, the WARP sequencer 130 (e.g., at the top of the instruction pipeline) may determine that an instruction needs to be converted and conversion information that includes various state information to be utilized by a PE (or by PE clusters) to modify an instruction according to the GPU configuration (e.g., an API-specified GPU hardware configuration). In some embodiments, the conversion information may be provided to a fixed-function unit 120 such as a LSU to facilitate mapping between different formats. For example, in various embodiments, when an instruction executed in a shader may produces a value or set of values that do not match with the format of a target render buffer, the LSU may provide mapping for the value(s).

Figure 2:
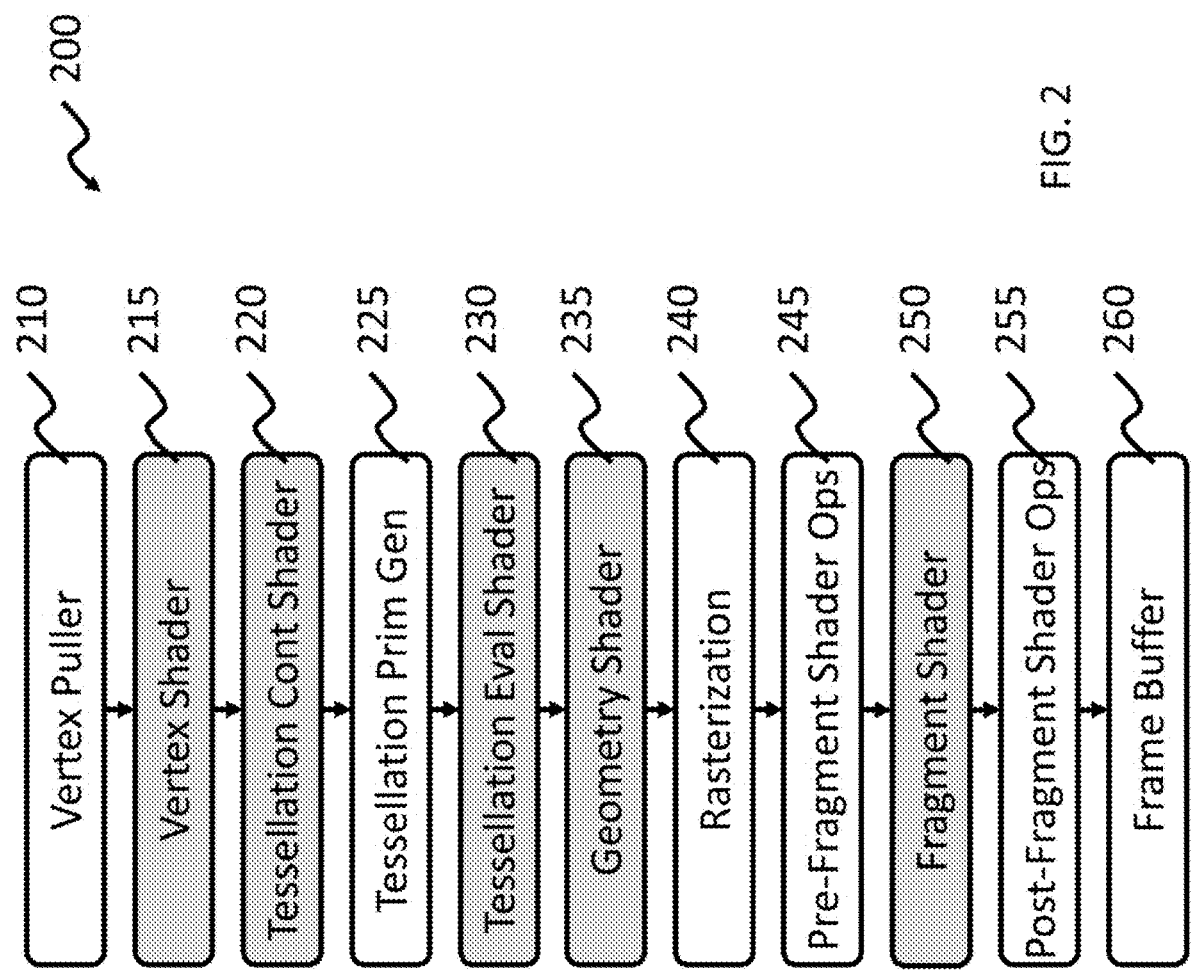
FIG. 2 depicts a functional block diagram of an example render pipeline according to various embodiments.

FIG. 2 depicts a functional block diagram of an example render pipeline according to various embodiments.

Referring to FIG. 2 and with continued reference to FIG. 1, in various embodiments, the PEs 110 are used in combination with the fixed-function units 120 to provide a render pipeline 200 for each vertex, primitive, and fragment being rendered. In various embodiments, the render pipeline 200 is configured to allow a program to specify objects to be drawn and displayed on the display. Thus, to display an image on a display may include a larger plurality of render pipelines operating in parallel. For example, primitives are rendered in sets called "draw calls." Each of the primitives within a draw call may use the same pipeline, but specific vertices, primitives, and fragments may be rendered independently according to a pre-defined order. Each of the draw calls may have a separate pipeline. Commands from the program (e.g., according to an ISA) are sent to the instruction pipeline at the WARP sequencer 130. The WARP sequencer provisions and dispatches the instructions to PEs 110 and fixed-function units 120 which operate in conjunction to perform the operations in the render pipeline 200. In various embodiments, different stages of the pipeline use data in different buffers and each buffer may expect data to be provided in a specific format.

In various embodiments, the pipeline begins by generating primitives. Primitives include points, line segments, triangles, and patches. In various embodiments, the pipeline 200 includes a vertex puller 210 and a vertex shader 215 for generating primitives. In various embodiments, the vertex puller may be implemented in fix-function units 120, while the vertex shader 215 may be executed by PEs 110. After the vertex shader 215 has executed, the tessellation control shader 220, the tessellation primitive generator 225, the tessellation evaluation shader 230, and the geometry shader 235 may be used to transform the geometric primitives into multiple primitives. In some cases, the various tessellation and geometry shaders may not be used. In various embodiments, the tessellation control shader 220, the tessellation evaluation shader 230, and the geometry shader 235 are each executed on PEs 110 while the tessellation primitive generator 225 may be implemented using fixed-function units 120. In various embodiments, the primitives are then clipped into a clip volume for rasterization 240 which produces fragments which include tile buffer or frame buffer locations and values using two-dimensional descriptions of points along with depth, line segments, or triangles. The fragments are then modified by the pre-fragment shader operations 245, the fragment shader 250, and post-fragment operations 255 before being output to the frame buffer (or tile buffer) 260. In various embodiments, the rasterization 240, pre-fragment shader operations 245, post-fragment shader operations 255, and the frame/tile buffer 260 may be implemented using fixed-function units 120 while the fragment shader 245 may be executed using PEs 110.

In various embodiments, each of the shaders 215, 220, 230, 235, 245 operate using code that was bindlessly compiled. Thus, the inputs and outputs of the shaders 215, 220, 230, 235, 245 may not be in complete alignment with inputs and outputs of the various other functions in the render pipeline 200.

Figure 3:
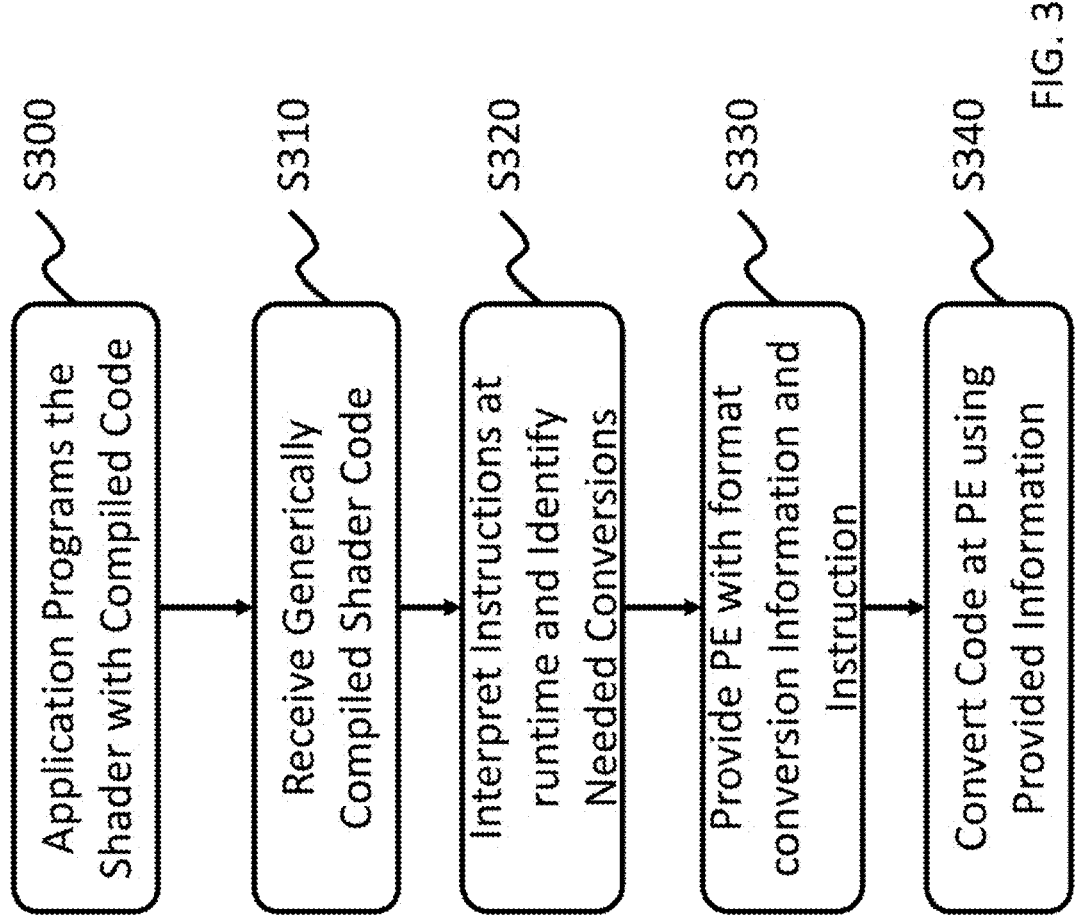
FIG. 3 depicts a flow chart illustrating a method of modifying instruction format according to various embodiments.

FIG. 3 depicts a flow chart illustrating a method of modifying instruction format according to various.

Referring to FIG. 3, in various embodiments, a graphical processing unit (GPU) includes a plurality of application programmable PEs that may be utilized by shaders. In various embodiments, the shaders have been compiled by a compiler with no knowledge of the specifics of the GPU's pipeline configuration (S300). Thus, the shader programs are bindless and the code has been compiled into an instruction set architecture that utilizes generic formats for format and layout of I/O operations. In various embodiments, the instructions are received at an instruction pipeline (S310). In various embodiments, the instruction pipeline includes a WARP sequencer that includes logic to parse instructions and allocate resources for the instruction. For example, the top of the instruction pipeline of the WARP sequencer may be configured to recognize basic arithmetic and logic operations, and organize and provision the fixed-function units and PEs to execute the instructions.

In various embodiments, the WARP sequencer may recognize when an instruction format should be converted to correspond to the GPU hardware (S320). When an instruction or sequence of instructions have been determined to need format conversion, the WARP sequencer may inform the relevant PE or PE cluster that a format conversion is needed and provide the PE(s) with information for completing the conversion. For example, in various embodiments, various state information that indicates the render target layout and format may be provided to the PE(s) (S330). For example, OpenGL ES supports multiple render targets and thus, the system permits the mapping of different output registers to different render targets and provides the format and layout on a per render target basis. In other examples, a fixed-function unit may require a floating point input having a particular number of bits (e.g., a 32-bit unsigned floating point).

In various embodiments, the PE receives the shader program's instructions based on an unbound (i.e., bindless) compilation along with the conversion information. In various embodiments, each PE includes a format conversion unit (FCU) configured to convert an instruction from a first format to a second format. In various embodiments, the FCU receives the instruction(s) and accompanying conversion information and converts the format to the bound format (S340).

FIG. 4A depicts an example assembly code sequence provided by a shader according to various embodiments. FIG. 4B depicts an example assembly code sequence that has been converted according to various embodiments.

Referring to FIG. 4A, in various embodiments, the WARP sequencer at the top of the instruction pipeline receives instructions and determines whether one or more of the instructions need to have their formats converted. For example, FIG. 4A includes instructions to multiply (FMUL) the contents of R3 and R2 and store the product in O6 (Instruction 400), add (FADD) the contents of R4 and R5 and store the sum in O7 (Instruction 410), and multiply (FMUL) the contents of R4 and R3 and pass the resulting product along the vector forwarding path Fv (Instruction 420). In various embodiments, the WARP sequencer determines that the instructions should be modified according to the hardware in GPU's render pipeline. For example, Instruction 400 stores the product in output register 6 (O6) and a format conversion is needed to conform with the format of the GPU configuration.

For example, referring to FIG. 4B, in various embodiments, the instructions of FIG. 4A may be modified according to the hardware configuration of the GPU. For example, the instructions of FIG. 4A may be modified such that the product of multiplying R3 and R2 is output to a forwarding vector Fv (e.g., a vector register file) instead of the output register O6 (Instruction 430). In various embodiments, FCU operations may be executed in a superscalar manner (e.g., multiple instructions may be executed at substantially the same time). Thus, the overall instruction count is unchanged since the format conversions are run in parallel.

In various embodiments, format conversion information is provided by the WARP sequencer to the PE in the form of a conversion-type argument. For example, the second and third instruction (Instruction 440, 450) were converted to utilize $R_{EMIT}$, a runtime generated staging register used to allow for data interchange between the shader program and the subsequent PE. In various embodiments, the WARP sequencer may provide the PE with conversion information specifying the use of $R_{EMIT}$ and the data format utilized by $R_{EMIT}$. For example, in various embodiments, the conversion-type argument informs the FCU of the desired output type (e.g., float, int, etc.), resulting size/precision (e.g., FP16, FP32, SNORM16, UNORM8, custom format, etc.) and other requirements (e.g., signed or unsigned).

In various embodiments, the FCU may be utilized for use by any output register (e.g., o #) references in a shader program. Thus, in some embodiments, an instruction with an output register reference should not be followed by an FCU instruction since the FCU won't be available. Thus, a compiler rule for the shader may be implemented to restrict the use of consecutive output register instructions and FCU instructions to prevent doubly committing usage of the FCU (because it is not format or layout specific, this scheduling rule does not violate the rule of bindless compilation).

Similarly, in various embodiments, the vector register file write port is being implicitly utilized for use when converting the output register references (e.g., because of the forwarding vector output). Thus, instructions with an output register designation should not be followed by an instruction that writes to the forward vector on the same cycle. For example, some instructions that have a vector destination that aren't written by the current instruction would not cause an issue (e.g., special functions such as sine, cosine, log, exponents, etc.).

Figure 5:
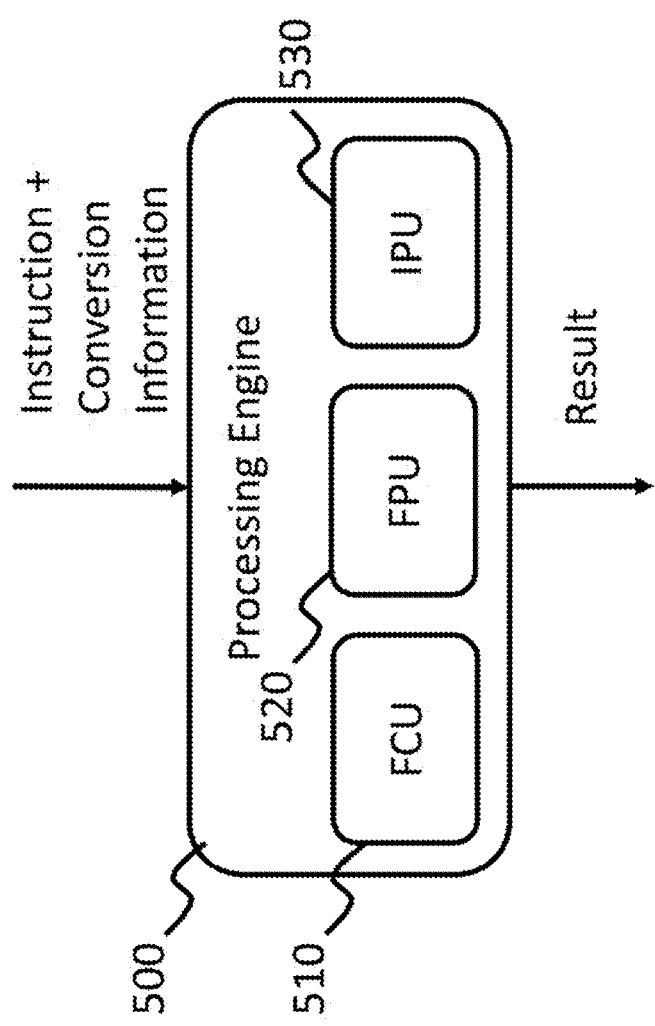
FIG. 5 depicts a functional block diagram of a processing engine (PE) according to various embodiments.

FIG. 5 depicts a functional block diagram of a processing engine (PE) according to various embodiments.

Referring to FIG. 5, in various embodiments, the processing engine 500 is configured to receive and execute instructions. In various embodiments, the processing engine 500 receives instructions and instruction conversion information. For example, the instruction may be received at the format conversion unit 510 which utilizes the conversion information to modify the instruction's operands according to the configuration of the GPU. In various embodiments, the processing engine includes a floating point unit (FPU) 520 for performing floating point operations, and an integer unit (IPU) 530 for performing integer operations.

Figure 6:
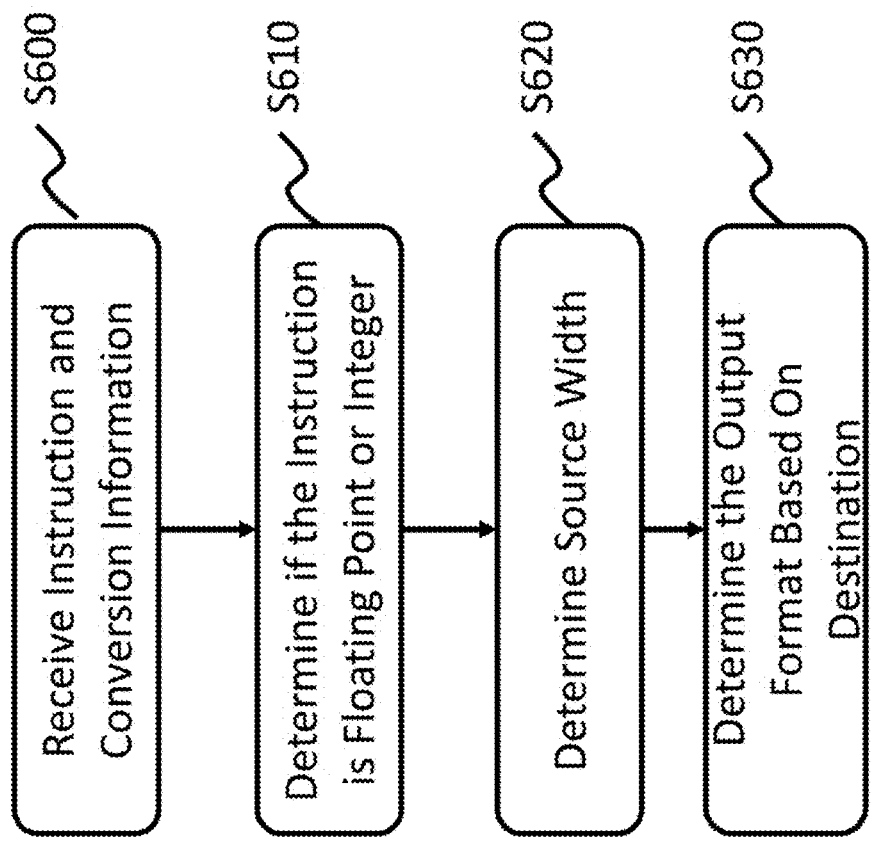
FIG. 6 depicts a method of performing binding according to various embodiments.

FIG. 6 depicts a method of performing binding according to various embodiments.

Referring to FIGS. 5 and 6, in various embodiments, each PE 500 includes a FCU 510 configured to receive instructions and conversion information from the WARP sequencer (S600). In various embodiments, the incoming instruction is used to determine the format of the incoming values (e.g., the source format). The FCU determines whether the source format is floating point, an unsigned integer, or a signed integer (S610). For example, if the instruction uses the FPU 520, the source format may be considered to be floating point. Similarly, if the instruction is a bit manipulation function (e.g., bit-field insertion, bit-field extraction, bit shift, etc.) the source format may be considered to be an unsigned integer, otherwise the source format may be considered to be a signed 2's compliment integer. In various embodiments, the source width may also be determined (S620). For example, some shaders may utilize super scalar operations. When super scalar operations are active, the source width may be considered to be 16 bits, while when these operations are inactive, the source width may be considered to be 32 bits.

In various embodiments, the output format produced by the FCU may be determined according to the conversion information (S630). In various embodiments, the conversion information includes the format for the render target. Thus, in various embodiments, the WARP sequencer may maintain a table of the different render targets. For example, OpenGL ES and Vulkan APIs require support for multiple render targets (e.g., 4 to 8), and depending on the output register provided in the instruction which is mapped to a particular render target, the WARP scheduler sends the appropriate render target with the conversion information.

In various embodiments, post-pixel shader operations may have various packing sizes and formats for the pixel, depth, coverage data that is sent to the rasterization system. For example, a post-pixel shader system may have a size and packing of 8 bits: 8 bits: 8 bits: 8 bits for each of R, G, B, A, with formats that include 8-bit unsigned normalized integer (UNORM8), an 8-bit signed integer (INT8), or an 8-bit unsigned integer (UINT8). In another example, the packing sizes may be 16 bits: 16 bits or 16 bits: 16 bits for each of R, G, B, A, with formats that include 16-bit floating point (FP16), 16-bit unsigned normalize integers (UNORM16), 16-bit signed integers (INT16), and 16-bit unsigned integers (UINT16). In another example, the packing sizes may be 32 bit, 32 bit: 32 bit or 32 bit: 32 bit: 32 bit: 32 bit, with formats that include 32-bit floating point (FP32), 32-bit unsigned integers (UINT32), and 32-bit signed integers (INT32).

In various embodiments, shaders having 16-bit floating point containers would include the following conversions:
  FP16 to UNORM8
  FP16 to INT8
  FP16 to UINT8
  FP16 to FP16 (pass-through)
  FP16 to UNORM16
  FP16 to INT16
  FP16 to UINT16
  FP16 to FP32
  FP16 to INT32
  FP16 to UINT32

Similarly, for FP32 sources, the same set of destination formats are needed. For example, shaders having 32-bit floating point containers would include the following conversions:
  FP32 to UNORM8
  FP32 to INT8
  FP32 to UINT8
  FP32 to FP16
  FP32 to UNORM16
  FP32 to INT16
  FP32 to UINT16
  FP32 to FP32 (pass-through)
  FP32 to INT32
  FP32 to UINT32

In another example, integer and fixed point conversions may also be needed. Some example integer/fixed point conversion include:
  INT 32 to INT16
  INT 32 to UINT16
  INT 32 to INT8
  INT 32 to UINT8
  INT 32 to UNORM16
  INT 32 to UNORM8
  UNORM 16 to UNORM8

In various embodiments, the system is configured to bind a shader to the layout of a render target. In some instances, the layout of a render buffer in the GPU may differ from the layout decided at the compile time of a shader. Thus, when the compiler's version of the render buffer that the shader is bound to may not match. In these cases, the system may be configured to dynamically map between the different layouts. For example, the system may discard extra components provided by the shader and/or provide default values for missing components to the render buffer. In various embodiments, the load store unit of the GPU may be configured to identify layout discrepancies and dynamically map between the formats.

For example, a shader may write to the same components (e.g., red and blue) multiple times and write the alpha component only once. Thus, the WARP Sequencer and the LSU need to coordinate the passing of the information upon reaching the end of the shader program. Thus, in various embodiments, the LSU is configured to accept the multiple shader outputs, but waits until the shader is complete before providing the output to appropriate buffer. Similarly, if upon arriving at the end of the shader program, a needed value has not been provided, the LSU may provide a default value or an undefined, but benign value.

In various embodiments, a table of the shader outputs may be initially generated by a GPU driver operating on an operating system. In various embodiments, the WARP sequencer and/or LSUs are configured to maintain the table during runtime. Repeated shader outputs may overwrite previous table entries until the shader has completed. In other embodiments, each output may be saved and superfluous entries may be dropped. Once the shader has completed, the LSU may determine if each required output for the render target has been provided. When a value is missing, the LSU provides the default value and loads the values into the target buffer.

In some cases, the shader may produce more components than the render target is configured to utilize. For example, a shader may produce 3 components and the render target may only be defined for 2 components. In this example, the unused 3rd component could be discarded and never sent to the target.

In various embodiments, the system is also configured to bind shaders to textures. Similar to binding to a render target, in some instances, the texture may include more, the same number as, or fewer components than the shader/compiler anticipates. Furthermore, the shader components may be in any arbitrary format. In various embodiments data format and data width are provided in the bit field encoding of the texture accessing instructions and are used to control the format conversion of return data from a write conversion unit. The values are populated by the texture unit based on the texture resource that is specified when a PE makes a texture read request. In various embodiments, the data source formats include UNORM, SNORM, UINT, INT, Fixed 8:8, FP, UNORM UI, FP UI and each data source may also include data widths of 8 bits, 16 bits, 24 bits, 32 bits, 24 bits-8 bits, and 32 bits-8 bits. In various embodiments, the PT field controls the destination format. In various embodiments, the destination format may include a 16 or 32 bit floating point value. In other words, the compiler may choose to operate using FP16 or FP32 data and an automatic conversion may be made upon returning filtered texture data to the PE based on noting the compiler's decoration of the provoking ISA instruction.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method for binding instructions to a graphical processing unit (GPU) comprising:
   receiving a bindlessly compiled instruction at the GPU;
   interpreting the bindlessly compiled instruction at runtime to identify a needed conversion;
   generating a conversion information based on the bindlessly compiled instruction and needed conversion;
   converting the bindlessly compiled instruction according to the conversion information to generate a bound format instruction; and
   executing the bound format instruction.

2. The method of claim 1, wherein, interpreting the bindlessly compiled instruction at runtime to identify a needed conversion comprises:
   recognizing, by a WARP sequencer when the bindlessly compiled instruction should be converted to correspond to an API-specified GPU hardware configuration.

3. The method of claim 2, wherein the WARP sequencer comprises an instruction pipeline having a top of instruction pipeline configured to interpret the bindlessly compiled instruction and generate the conversion information.

4. The method of claim 1, wherein converting the bindlessly compiled instruction according to the conversion information to generate a bound format instruction comprises:
   receiving, at a processing engine, the bindlessly compiled instruction and the conversion information; and
   generating, using a format conversion unit of the processing engine, the bound format instruction using the bindlessly compiled instruction and the conversion information.

5. The method of claim 4, wherein the format conversion unit operates in parallel with at least one of an integer or a floating point unit of the processing engine.

6. The method of claim 1, wherein the conversion information comprises at least one of a render target format, a render target layout, or a texture format.

7. The method of claim 6, further comprising:
   providing the bindlessly compiled instruction and the conversion information to a load store unit (LSU); and
   mapping a shader output layout to a buffer layout.

8. The method of claim 7, wherein mapping the shader output layout to a buffer layout comprises at least one of providing a default value for a missing component or discarding an extra component.

9. A GPU comprising:
   a fixed-function unit;
   a WARP sequencer configured to receive a bindlessly compiled instruction and generate a conversion information based on the bindlessly compiled instruction and the fixed-function unit; and
   a processing engine configured to receive the bindlessly compiled instruction and generate a bound format instruction based on the bindlessly compiled instruction and the conversion information.

10. The GPU of claim 9, wherein the processing engine comprises using a format conversion unit, wherein the format conversion unit is configured to:
    receive the bindlessly compiled instruction and the conversion information; and
    generate a bound format instruction using the bindlessly compiled instruction and the conversion information.

11. The GPU of claim 9, wherein the fixed-function unit comprises a render buffer.

12. The GPU of claim 9, wherein the fixed-function unit comprises a rasterization subsystem.

13. The GPU of claim 9, wherein the fixed-function unit comprises a load store unit.

14. The GPU of claim 13, wherein the conversion information comprises a render target layout.

15. The GPU of claim 14, wherein the load store unit is configured to generate a table for receiving updates from a shader operating on the GPU and provide an output to a render target according to the render target layout when the shader operation has completed.

16. The GPU of claim 15, wherein the load store unit is further configured to provide a default value to the render target for a missing value that was not provided by the shader.

17. The GPU of claim 15, wherein the load store unit is further configured to discard a value provided by the shader that is not required by the render target format.

18. The GPU of claim 9, wherein the conversion information comprises a render target format.

19. The GPU of claim 9, wherein the conversion information comprises a texture format.

20. The GPU of claim 9, wherein the WARP sequencer comprises a table of render target formats.

21. The GPU of claim 9, wherein the WARP sequencer comprises an instruction pipeline having a top of instruction pipeline configured to interpret the bindlessly compiled instruction and generate the conversion information.

22. A method for binding instructions to a graphical processing unit (GPU) comprising:
    receiving a bindlessly compiled instruction at the GPU;
    interpreting, by a WARP sequencer of the GPU, the bindlessly compiled instruction at runtime to identify a needed conversion;
    generating, by the WARP sequencer, a conversion information based on the bindlessly compiled instruction and needed conversion;
    providing, by the WARP sequencer, the bindlessly compiled instruction and the conversion information to a processing engine;
    converting, by a format conversion unit of the processing engine, the bindlessly compiled instruction according to the conversion information to generate a bound format instruction; and
    executing, by the processing engine, the bound format instruction.

23. The method of claim 22, wherein the WARP sequencer comprises an instruction pipeline having a top of instruction pipeline configured to interpret the bindlessly compiled instruction and generate the conversion information.

24. The method of claim 22, wherein the conversion information comprises at least one of a render target format, a render target layout, or a texture format.

25. The method of claim 24, further comprising:
    providing, by the WARP sequencer, the bindlessly compiled instruction and the conversion information to a load store unit (LSU); and
    mapping, by the LSU, a shader output layout to a buffer layout.

26. The method of claim 25, wherein mapping the shader output layout to a buffer layout comprises at least one of providing a default value for a missing component or discarding an extra component.

* * * * *